United States Patent

Onizuka et al.

[11] Patent Number: 5,954,992
[45] Date of Patent: Sep. 21, 1999

[54] HEXAGONAL Z TYPE MAGNETIC OXIDE SINTERED MATERIAL, METHOD FOR MAKING AND IMPEDANCE DEVICE

[75] Inventors: Masahiro Onizuka; Yutaka Saito, both of Akita, Japan

[73] Assignee: TDK Corporation, Tokyo, Japan

[21] Appl. No.: 08/901,520

[22] Filed: Jul. 28, 1997

[30] Foreign Application Priority Data

Jul. 26, 1996 [JP] Japan ................................. 8-197198

[51] Int. Cl.$^6$ .................................................. H01F 1/34
[52] U.S. Cl. .............................. 252/62.63; 252/62.59
[58] Field of Search .............................. 252/62.59, 62.63

[56] References Cited

U.S. PATENT DOCUMENTS

| | | | |
|---|---|---|---|
| 2,946,752 | 7/1960 | Jonker et al. | 252/62.63 |
| 3,188,400 | 6/1965 | Vilensky | 252/62.59 |
| 3,461,072 | 8/1969 | Winkler | 252/62.63 |

FOREIGN PATENT DOCUMENTS

| | | |
|---|---|---|
| 33-736 | 2/1958 | Japan . |
| 3-16910 | 1/1991 | Japan . |

*Primary Examiner*—Melissa Bonner
*Attorney, Agent, or Firm*—Oblon, Spivak, McClelland, Maier & Neustadt, P.C.

[57] ABSTRACT

The invention provides a hexagonal Z type magnetic oxide sintered material having a high resistivity and high density, and an impedance device using the same. The hexagonal Z type magnetic oxide sintered material contains a main oxide component containing M wherein M is at least one of Ba and Sr, Co, and Fe and an auxiliary oxide component containing Si, having a resistivity of at least $10^6$ $\Omega$-cm, a sintered density of at least 4.6 g/cm$^3$, and an initial magnetic permeability of 5 to 25. Pb may be contained in the auxiliary oxide component. Co may be partially replaced by Me wherein Me is at least one of Ni, Zn, and Cu.

10 Claims, 2 Drawing Sheets

HEXAGONAL Z TYPE MAGNETIC OXIDE SINTERED MATERIAL, METHOD FOR MAKING AND IMPEDANCE DEVICE

BACKGROUND OF THE INVENTION

1. Field of the Invention

This invention relates to a hexagonal Z type magnetic oxide sintered material having a high resistance, a method for preparing the same, and an impedance device using the same.

2. Prior Art

In accordance with size and weight reductions of modern electronic equipment, a shift of the operating frequency to a higher one is now being undertaken. It is essential to tailor components of electronic equipment so as to comply with the higher frequency. Under such circumstances, there is a tendency that the noise generated by the electronic equipment is also increased in frequency.

Since the noise generated can affect the components and peripheral equipment to cause malfunction, a countermeasure for noise is essential for electronic equipment.

One countermeasure for noise is an impedance device or impedor using ferrite material.

The impedance device is to remove noise by absorbing noise as a loss of ferrite and converting it into heat. Because of simple structure and low cost, impedance devices are used in many equipment.

Prior art impedance devices mainly use nickel base spinel type ferrite. However, in conjunction with the recent shift toward higher frequency, the noise generating above the frequency band that impedance devices using nickel base spinel type ferrite can remove becomes serious.

For example, current personal computers operate at a clock frequency of higher than 100 MHz and a future shift toward higher frequency is expected. In such a case, the frequency of noise generated therefrom is higher than the clock frequency, for example, higher than 500 MHz. The spinel type oxide magnetic materials, however, have the nature that magnetic permeability suddenly drops beyond a certain frequency. Then conventional impedance devices using spinel type oxide magnetic material are quite difficult to remove noise generated at 500 MHz or higher.

Therefore, a material which is magnetic, but experiences no drop of magnetic permeability in the high frequency range is desired as the material for impedance devices. One magnetic material meeting this requirement is, for example, the hexagonal oxide ferromagnetic material disclosed in JP-B 736/1958. An impedance device using such a hexagonal oxide ferromagnetic material is disclosed in JP-A 16910/1991.

This hexagonal oxide ferromagnetic material is a hexagonal Z type magnetic oxide sintered material.

The hexagonal magnetic oxide sintered material is classified into M type ($AFe_{12}O_{19}$), W type ($AB_2Fe_{16}O_{27}$), Y type ($A_2B_2Fe_{12}O_{22}$), Z type ($A_3B_2Fe_{24}O_{24}$), etc. The Z type material is a compound represented by the general formula: $M_3Me_2Fe_{24}O_{41}$ wherein M is an alkaline earth metal ion and Me is a divalent metal ion. Since the Z type materials wherein Me is cobalt have an axis of easy magnetization in a plane of a hexagonal crystal and hence greater anisotropy, they retain high magnetic permeability up to a higher frequency region as compared with the spinel type oxide magnetic materials and are thus best suited as the material for those impedance devices used in the high frequency region.

The hexagonal Z type magnetic oxide sintered material, however, has the drawback that its resistivity is low. In constructing an impedance device, electrolytic plating is carried out so as to cover electrodes in order to improve the reliability of the electrodes. If the resistivity of magnetic material is low, there is a likelihood that the plating metal extend from the electrode region to the magnetic material region to incur a shortcircuit accident. Probable countermeasures are masked plating and electroless plating, for example. If these countermeasures are taken, an extra step is added to the manufacture process to increase the cost of manufacture.

It is generally believed that such a problem may be avoided if the resistivity is $10^6$ Ω-cm or higher.

The hexagonal Z type magnetic oxide sintered material also has the drawback that its sintered density is low. Because of the current tendency that many electronic equipment parts are replaced by surface mount parts, parts are required to have mechanical strength. Impedance devices are not an exception and the mechanical strength of impedance devices themselves must be increased. Since the hexagonal Z type magnetic oxide sintered material, however, has a low sintered density, sufficient mechanical strength is seldom achievable. In general, a sintered density of at least 4.6 g/cm$^3$, preferably at least 4.7 g/cm$^3$ is believed sufficient to provide the strength necessary for magnetic oxide materials. Also, the sintered density is closely related to magnetic permeability so that a lower sintered density leads to a lower magnetic permeability. Then, the inherent characteristics that the hexagonal Z type magnetic oxide sintered material possesses cannot be reflected if the sintered density is low. It is known that in order to increase the sintered density of hexagonal Z type magnetic oxide sintered material, elevating the firing temperature is generally effective.

However, the hexagonal Z type magnetic oxide sintered material prepared by firing at elevated temperature contains $Fe^{2+}$ which is generated as a result of reduction of $Fe^{3+}$ in the magnetic oxide. The generation of $Fe^{2+}$ causes to reduce the resistivity of the magnetic oxide, giving rise to a problem upon electrolytic plating as mentioned above and leaving an increased likelihood of electric breakdown.

For this reason, it is undesirable to increase the sintered density of hexagonal Z type magnetic oxide sintered material by elevating the firing temperature.

A method for preparing a hexagonal z type magnetic oxide sintered material by hot pressing was recently proposed. With this method, a high density is obtained at a relatively low temperature. This method, however, has not been practically implemented since it requires a large size installation and complex handling.

DISCLOSURE OF THE INVENTION

Therefore, an object of the invention is to provide a hexagonal Z type magnetic oxide sintered material having a high resistivity and high density, and an impedance device using the same.

The above object is achieved by any one of the constructions which are defined below as (1) to (13).

(1) A hexagonal Z type magnetic oxide sintered material comprising a main oxide component containing M wherein M is at least one of barium and strontium, cobalt, and iron and an auxiliary oxide component containing silicon, having a resistivity of at least $10^6$ Ω-cm, a sintered density of at least 4.6 g/cm$^3$, and an initial magnetic permeability of 5 to 25.

(2) The hexagonal Z type magnetic oxide sintered material of (1) wherein said auxiliary oxide component further contains lead.

(3) The hexagonal Z type magnetic oxide sintered material of (1) wherein when iron, M, and cobalt in the main oxide component are calculated as $Fe_2O_3$, MO, and CoO, respectively, and their proportions relative to the total of ($Fe_2O_3$ +MO +CoO) are determined, the proportion of $Fe_2O_3$ is 68 to 74 mol %, the proportion of MO is 15 to 22 mol %, and the proportion of CoO is 4 to 13 mol %, and when silicon in the auxiliary oxide component is calculated as $SiO_2$ and the proportion of $SiO_2$ relative to the total of main component oxides ($Fe_2O_3$+MO+CoO) is determined, the proportion of $SiO_2$ is 0.02 to 5% by weight.

(4) The hexagonal Z type magnetic oxide sintered material of (3) wherein said auxiliary oxide component further contains lead, and when lead in said auxiliary oxide component is calculated as PbO and the proportion of PbO relative to the total of main component oxides ($Fe_2O_3$ +MO +CoO) is determined, the proportion of PbO is 0.04 to 10% by weight.

(5) The hexagonal Z type magnetic oxide sintered material of (1) wherein part of cobalt is replaced by Me wherein Me is at least one of nickel, zinc, and copper.

(6) The hexagonal Z type magnetic oxide sintered material of (1) which is produced by firing in air.

(7) The hexagonal Z type magnetic oxide sintered material of (6) which is produced by calcining a source for the main oxide component, adding a source for the auxiliary oxide component to the calcined material, and firing the mixture.

(8) A method for preparing the hexagonal Z type magnetic oxide sintered material of (1) comprising the step of firing in air.

(9) The method for preparing the hexagonal Z type magnetic oxide sintered material according to (8) comprising the steps of calcining a source for the main oxide component, adding a source for the auxiliary oxide component to the calcined material, and firing the mixture.

(10) The method for preparing the hexagonal Z type magnetic oxide sintered material according to (8) wherein glass is used as the source for the auxiliary oxide component.

(11) An impedance device comprising the hexagonal type magnetic oxide sintered material of (1).

(12) The impedance device of (11) comprising a chip-shaped ferrite block having a first surface and a second surface opposed to the first surface, at least one through-hole extending through said ferrite block from the first surface to the second surface, an internal conductor formed within the hole, and a pair of terminal electrodes formed on surfaces of said ferrite block, the pair of terminal electrode being serially connected through the internal conductor, said ferrite block comprising the hexagonal Z type magnetic oxide sintered material of (1).

(13) The impedance device of (12) wherein at least two holes each having an internal conductor formed therein are present, the internal conductors being serially connected to each other.

DESCRIPTION OF THE PREFERRED EMBODIMENTS

Figure 1:
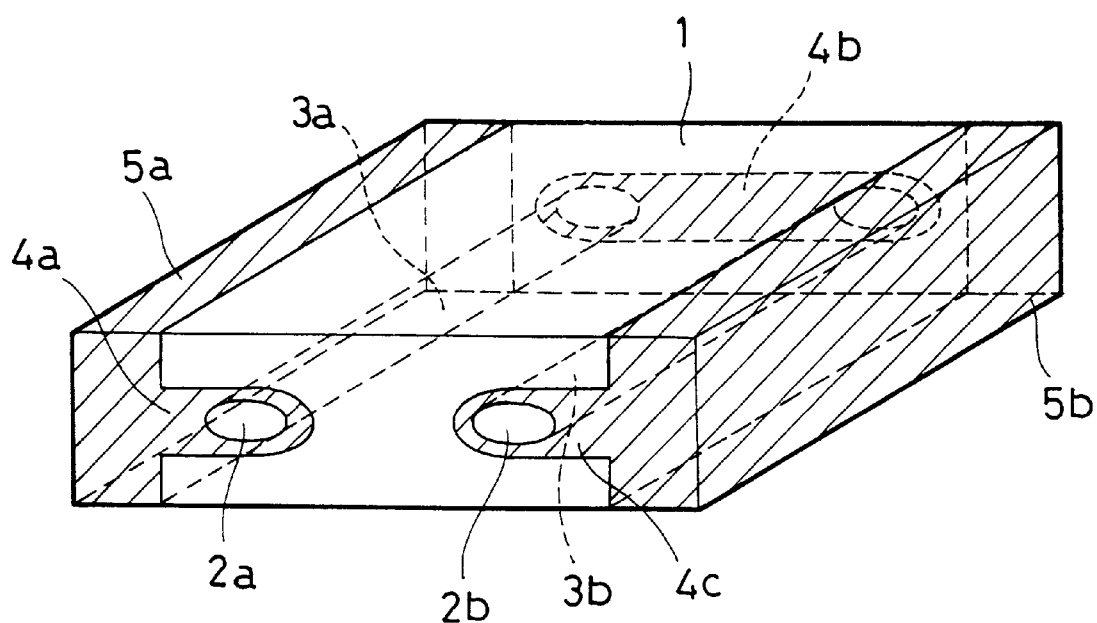
FIG. 1 is a perspective view showing an exemplary construction of an impedance device according to the invention.

The hexagonal Z type magnetic oxide sintered material of the invention contains M wherein M is at least one of barium (Ba) and strontium (Sr), cobalt (Co), iron (Fe), and oxygen (O) as a main component and silicon (Si) and oxygen (O) or silicon (Si), lead (Pb) and oxygen (O) as an auxiliary component. The inclusion of such an auxiliary component allow the material to have a resistivity of at least $10^6$ Ω-cm and a sintered density of at least 4.6 g/cm$^3$. Additionally the initial magnetic permeability is as high as 5 to 25. Then, when the hexagonal Z type magnetic oxide sintered material of the invention is applied to an impedance device, there can be achieved an impedance device which can be operated at a high frequency, for example, higher than 500 MHz and has a high mechanical strength. No particular upper limit is imposed on the range of operating frequency although operation at a frequency up to about 4 or 5 GHz is made possible by a proper choice of the composition.

It is noted that Japanese Patent Application No. 263391/1995 by the same inventors which was filed prior to the filing of the basic application of the present application and laid open to the public as JP-A 110432/1997 subsequent to the filing of the same basic application describes a Z type hexagonal oxide magnetic material containing Fe, Co, M (wherein M is at least one of Ba, Sr and Pb), Si, Ca, and O. This magnetic material is different from the oxide sintered material of the invention in that it contains Ca, but analogous to the oxide sintered material of the invention in that it contains Si and optional Pb. In Example of Japanese Patent Application No. 263391/1995, however, $SiO_2$ is mixed with main component oxide source such as $Fe_2O_3$, and the mixture is calcined and then fired. When $SiO_2$ is added prior to firing, $SiO_2$ makes little contribution to a resistivity improvement. Then, in order to increase resistivity by preventing the generation of $Fe^{2+}$ as a result of reduction of $Fe^{3+}$, firing must be done in an atmosphere having a high oxygen partial pressure. Although it is described in Japanese Patent Application No. 263391/1995 that firing may be done in an atmosphere having an oxygen partial pressure of 20 to 100%, firing is actually done in 100% oxygen in Example. In fact, a high resistivity of at least $10^6$ Ω-cm is not achievable unless firing is done in an atmosphere having a high oxygen partial pressure.

Furthermore, Pb is handled in Japanese Patent Application No. 263391/1995 as an element which replaces at least a part of Ba and Sr constituting the main oxide component whereas Pb is an element constituting an auxiliary oxide component in the present invention. For this reason, in Japanese Patent Application No. 263391/1995, mixing of PbO as a main component oxide source is followed by calcination. Since PbO which is added prior to calcination little contributes to a resistivity improvement, firing must still be done in an atmosphere having a high oxygen partial pressure in order to achieve a resistivity improvement.

In contrast, in the preferred embodiment of the invention, a main oxide component source is calcined before $SiO_2$ and optional PbO are added thereto and the mixture is then fired. Where the auxiliary oxide component source is added to the main oxide component source subsequent to the calcination thereof, a high resistivity of at least $10^6$ Ω-cm is achievable even by calcination and firing in air. Although the reason is not well understood, the fact that a high resistivity is available even by firing in air when a glass containing $SiO_2$ and optional PbO is used as the auxiliary oxide component source suggests that $SiO^2$ and optional PbO vitrify upon firing to thereby increase the resistivity of the sintered material.

The present invention avoids the addition of CaO because the addition of CaO leads to a lower resistivity when firing is done in air. In this regard, firing in air is inadequate for the material of Japanese Patent Application No. 263391/1995 to which CaO is added.

The advantages of the invention, especially improved resistivity become more outstanding when the auxiliary oxide component contains both silicon and lead.

EXAMPLE

Examples of the invention are given below by way of illustration.

Source oxides and carbonates such as $Fe_2O_3$, $CO_3O_4$, $BaCO_3$, and $SrCO_3$ were weighed so that the oxide magnetic material might have the composition shown in Table 1 and wet mixed in a ball mill.

Next, the material mixed in the ball mill was calcined in air at the temperature shown in Table 1 and thereafter, wet pulverized in a ball mill. At this point, $SiO_2$ and PbO were added to the material, and a binder and other addenda added thereto. The material was molded into a toroidal shape and fired in air at the temperature shown in Table 1.

It is understood that although $SiO_2$ and PbO are added after wet pulverization subsequent to calcination in this Example, they may be concurrently added upon blending. However, it is preferred to add $SiO_2$ and PbO subsequent to calcination as in this Example because a high resistivity is readily achievable even when firing is done in air.

The thus obtained samples of Example were measured for initial permeability at 100 kHz, sintered density and resistivity, with the results being shown in Table 2.

Note that the initial permeability was measured by winding a conductor around a toroidal shaped sample and using an LCR meter, according to the inductance method prescribed in JIS C 2561.

The density of the sintered body was determined by measuring outer dimensions by means of slide calipers, calculating a volume therefrom, measuring a weight, and calculating a density.

The resistivity was determined by applying In-Ga electrodes to end surfaces of a disc shaped sample, measuring an insulation resistance by means of an insulation resistance meter, and calculating from the outer dimensions of the sample.

TABLE 1

| | Main oxide component (mol %) | | | | | | | Auxiliary oxide component (wt %) | | Calcining temperature | Firing temperature |
|---|---|---|---|---|---|---|---|---|---|---|---|
| | $Fe_2O_3$ | BaO | SrO | CoO | NiO | CuO | ZnO | PbO | $SiO_2$ | (° C./atmosphere) | (° C./atmosphere) |
| 1 | 70.59 | 19.15 | — | 10.27 | — | — | — | 2 | 0.62 | 1200/air | 1200/air |
| 2 | 70.59 | 19.15 | — | 10.27 | — | — | — | 2 | 0.62 | 1200/air | 1250/air |
| 3 | 70.59 | 19.15 | — | 9.75 | 0.51 | — | — | 2 | 0.62 | 1200/air | 1200/air |
| 4 | 70.59 | 19.15 | — | 9.24 | 1.03 | — | — | 2 | 0.62 | 1200/air | 1200/air |
| 5 | 70.59 | 19.15 | — | 8.73 | 1.54 | — | — | 2 | 0.62 | 1200/air | 1200/air |
| 6 | 70.59 | 19.15 | — | 9.75 | — | 0.51 | — | 2 | 0.62 | 1200/air | 1200/air |
| 7 | 70.59 | 19.15 | — | 9.75 | — | — | 0.51 | 2 | 0.62 | 1200/air | 1200/air |
| 8 | 70.59 | 12.77 | 6.38 | 10.27 | — | — | — | 2 | 0.62 | 1200/air | 1200/air |
| 9 | 70.59 | 9.57 | 9.57 | 10.27 | — | — | — | 2 | 0.62 | 1200/air | 1200/air |
| 10 | 70.59 | 19.15 | — | 10.27 | — | — | — | 2.2 | 0.62 | 1200/air | 1200/air |
| 11 | 70.59 | 19.15 | — | 10.27 | — | — | — | 2.5 | 0.62 | 1200/air | 1200/air |
| 12 | 70.59 | 19.15 | — | 10.27 | — | — | — | 3 | 0.62 | 1200/air | 1200/air |
| 13 | 70.59 | 19.15 | — | 10.27 | — | — | — | 2 | 0.93 | 1200/air | 1200/air |
| 14 | 70.59 | 19.15 | — | 10.27 | — | — | — | 2 | 1.12 | 1200/air | 1200/air |
| 15 | 70.59 | 19.15 | — | 10.27 | — | — | — | 2 | 1.62 | 1200/air | 1200/air |
| 16 | 70.59 | 19.15 | — | 10.27 | — | — | — | 2.2 | 0.93 | 1200/air | 1200/air |
| 17 | 70.59 | 19.15 | — | 10.27 | — | — | — | 2.5 | 1.12 | 1200/air | 1200/air |
| 18 | 70.59 | 19.15 | — | 10.27 | — | — | — | 3 | 1.62 | 1200/air | 1200/air |
| 19 | 70.59 | 19.15 | — | 10.27 | — | — | — | 5 | 5 | 1200/air | 1150/air |
| 20 | 70.59 | 19.15 | — | 10.27 | — | — | — | 10 | 5 | 1200/air | 1150/air |
| 21 | 68.5 | 19.74 | — | 11.77 | — | — | — | 2 | 0.62 | 1200/air | 1200/air |
| 22 | 73.5 | 17.65 | — | 8.85 | — | — | — | 2 | 0.62 | 1200/air | 1200/air |
| 23 | 69.59 | 17.64 | — | 12.77 | — | — | — | 2 | 0.62 | 1200/air | 1200/air |
| 24 | 70.59 | 19.15 | — | 10.27 | — | — | — | 1 | 0.5 | 1200/air | 1200/air |
| 25 | 70.59 | 19.15 | — | 10.27 | — | — | — | 0.19 | 0.13 | 1200/air | 1150/air |
| 26 | 70.59 | 19.15 | — | 10.27 | — | — | — | 0.048 | 0.032 | 1200/air | 1200/air |
| 51 | 70.59 | 17.65 | — | 11.77 | — | — | — | — | — | 1200/air | 1300/air |
| 52 | 70.59 | 17.65 | — | 11.77 | — | — | — | — | — | 1200/air | 1350/air |
| 53 | 70.59 | 19.15 | — | 10.27 | — | — | — | — | — | 1200/air | 1300/air |

TABLE 2

| | Initial permeability @ 100 kHz | Sintered density (g/cm$^3$) | Resistivity (Ω-cm) |
|---|---|---|---|
| 1 | 13 | 4.7 | $10^8$ |
| 2 | 17 | 4.8 | $10^7$ |
| 3 | 13 | 4.8 | $10^7$ |
| 4 | 17 | 4.8 | $10^7$ |
| 5 | 19 | 4.8 | $10^7$ |
| 6 | 14 | 4.7 | $10^8$ |
| 7 | 13 | 4.8 | $10^8$ |
| 8 | 9 | 4.7 | $10^7$ |
| 9 | 14 | 4.8 | $10^7$ |
| 10 | 12 | 4.7 | $10^8$ |

TABLE 2-continued

|    | Initial permeability @ 100 kHz | Sintered density (g/cm³) | Resistivity (Ω-cm) |
|----|-----|-----|-----|
| 11 | 12  | 4.7 | $10^7$ |
| 12 | 13  | 4.8 | $10^7$ |
| 13 | 12  | 4.7 | $10^7$ |
| 14 | 10  | 4.7 | $10^7$ |
| 15 | 7   | 4.8 | $10^8$ |
| 16 | 12  | 4.7 | $10^7$ |
| 17 | 10  | 4.8 | $10^7$ |
| 18 | 7   | 4.8 | $10^7$ |
| 19 | 6   | 4.9 | $10^8$ |
| 20 | 5   | 4.9 | $10^8$ |
| 21 | 10  | 4.8 | $10^8$ |
| 22 | 15  | 4.9 | $10^7$ |
| 23 | 9   | 4.8 | $10^7$ |
| 24 | 11  | 4.7 | $10^8$ |
| 25 | 8   | 4.7 | $10^7$ |
| 26 | 13  | 4.6 | $10^6$ |
| 51 | 12  | 4.5 | $10^5$ |
| 52 | 11  | 4.7 | $10^4$ |
| 53 | 19  | 4.9 | $10^5$ |

As seen from Table 2, sample Nos. 1 to 24 within the scope of the invention have a resistivity of at least $10^7$ Ω-cm despite a sintered density of at least 4.7 g/cm³ which ensures sufficient strength as an oxide magnetic body, indicating fully satisfactory performance as an impedance device as compared with comparative sample Nos. 51 to 53.

Although PbO and $SiO_2$ are used in order to introduce Pb and Si in sample Nos. 1 to 24, it is acceptable to use instead of $SiO_2$, talc ($Mg_2$ $Si_4$ $O_{10}$ $(OH)_2$) or a glass powder containing PbO and $SiO_2$ as main components. The glass powder ay consist essentially of these main components while it may further contain another oxide, for example, at least one of $Al_2O_3$, $ZrO_2$, CaO, ZnO, $K_2O$, and $Na_2O$.

Sample Nos. 25 and 26 used a glass powder containing 88% by weight of PbO and $Sio_2$, combined, in a PbO:$SiO_2$ weight ratio of 6:4. The PbO and $Sio_2$, contents of these samples shown in Table 1 were calculated from the glass composition. Sample No. 25 has a resistivity of at least $10^7$ Ω-cm despite a sintered density of at least 4.7 g/cm³ which ensures sufficient strength as an oxide magnetic body, indicating that characteristics equivalent to the remaining samples within the scope of the invention are obtained even when glass powder is used. Sample No. 26 has a sintered density and a resistivity which are slightly lower than sample No. 25, but still fully acceptable on practical use.

It is thus evident from Tables 1 and 2 that hexagonal Z type magnetic oxide sintered materials within the scope of the invention are adequate as an impedance device material which is required to have a high resistivity and a high density at the same time.

Although the hexagonal Z type magnetic oxide sintered material of the invention can be applied to impedance devices of various structures, it is advantageously applied to an impedance device of the exemplary structure shown in FIG. 1.

Next, impedance devices of the structure shown in FIG. 1 were fabricated using sample Nos. 1 and 2 within the scope of the invention.

The impedance device shown in FIG. 1 was fabricated by constructing a chip-like ferrite block 1 from the material of sample No. 1 or 2 shown in Table 1, drilling two through-holes 2a and 2b extending from a first surface to a second surface opposed thereto, forming internal conductors 3a and 3b within the through-holes 2a and 2b, respectively, and forming a pair of terminal electrodes 5a and 5b and conductive strips 4a, 4b, and 4c on surfaces of the ferrite block 1. The pair of terminal electrodes are serially connected via the internal conductors which are serially connected. In the illustrated embodiment, the terminal electrode 5a is connected to the internal conductor 3a via the conductive strip 4a, the internal conductor 3a connected to the internal conductor 3b via the conductive strip 4b, and the terminal electrode 5b connected to the internal conductor 3b via the conductive strip 4c. The conductive strips 4a, 4b and 4c and terminal electrodes 5a and 5b are formed as a laminate consisting of three layers, a first layer of copper, a second layer of nickel, and a third layer of tin. This structure is designed such that the magnetic fluxes created by the internal conductors 3a and 3b are in opposite directions and offset each other.

Figure 2:
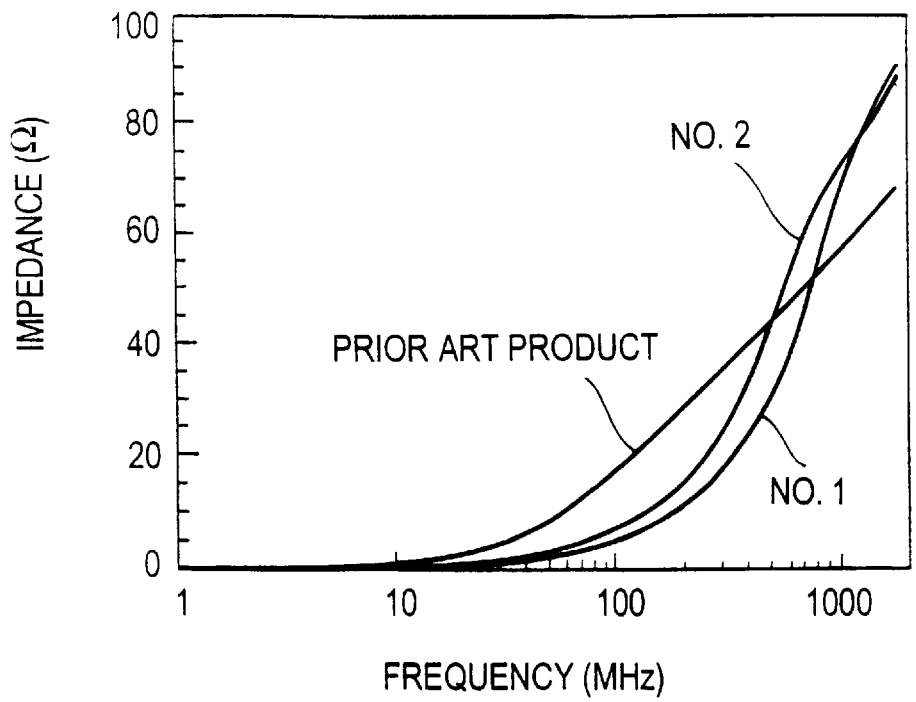
FIGS. 2A and 2B are graphs showing the frequency response of impedance devices according to the invention.
Figure 2:
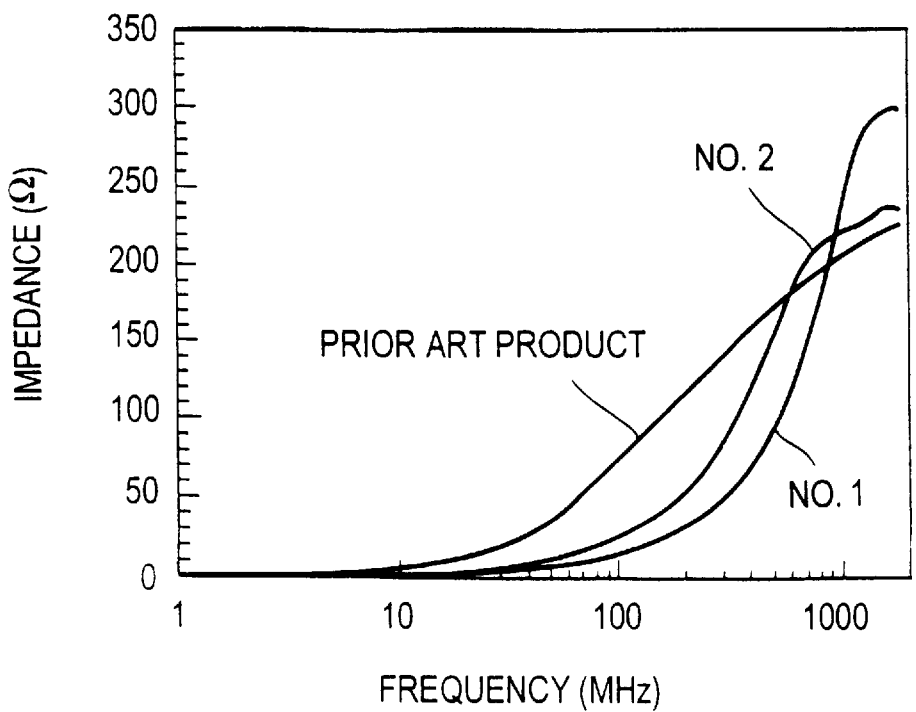

An impedance device of the above-mentioned structure was fabricated to dimensions of 1.6 mm long, 3.2 mm wide, 1.1 mm high and measured for frequency response of impedance, with the results shown in FIG. 2A. Another impedance device was fabricated to dimensions of 3.2 mm long, 4.5 mm wide, 1.6 mm high and measured for frequency response of impedance, with the results shown in FIG. 2B. The response of the device using sample No. 1 is shown by curve No. 1 in each graph and the response of the device using sample No. 2 is shown by curve No. 2 in each graph.

A comparative impedance device was fabricated in the same manner as the above-mentioned impedance devices except that a nickel base spinel type ferrite which is conventionally used in impedance devices was used as the ferrite block 1. This comparative impedance device was also measured for frequency response of impedance. The results of measurement are shown by curves labeled "Prior Art Product" in FIGS. 2A and 2B.

It is evident from FIGS. 2A and 2B that impedance devices using hexagonal Z type magnetic oxide sintered materials according to the invention have a low impedance in a relatively low frequency region and an acutely increasing impedance value in a relatively high frequency region, as compared with the device using the conventional nickel base spinel type ferrite. This result suggests that the impedance device according to the invention has fully adequate characteristics as a noise-suppressing product in the high frequency region.

Of course, the structure and dimensions of the impedance device are not limited to the illustrated embodiments. For example, the number of through-holes drilled in the ferrite block may be 1 or more than 2. The outer dimensions are arbitrary, for example, 2.5 mm long, 3.2 mm wide, and 1.3 mm high and 1.2 mm long, 2.0 mm wide, and 0.9 mm high.

We claim:

1. A hexagonal z type magnetic oxide sintered material comprising a main oxide component containing M wherein M is at least one of barium and strontium, cobalt, and iron and an auxiliary oxide component containing silicon and lead, having a resistivity of at least $10^6$ Ω-cm, a sintered density of at least 4.6 g/cm³, and an initial magnetic permeability of 5 to 25, wherein lead in said auxiliary oxide component is calculated as PbO and the proportion of PbO relative to the total of main component oxides ($Fe_2O_3$+MO+CoO) is 0.04 to 10% by weight.

2. The hexagonal Z type magnetic oxide sintered material of claim 1 wherein when iron, M, and cobalt in the main oxide component are calculated as $Fe_2O_3$, MO, and CoO, respectively, and their proportions relative to the total of ($Fe_2O_3$+MO+CoO) are determined, the proportion of $Fe_2O_3$ is 68 to 74 mol %, the proportion of MO is 15 to 22 mol %, and the proportion of CoO is 4 to 13 mol %, and when silicon in the auxiliary oxide component is calculated as $SiO_2$ and the proportion of $SiO_2$ relative to the total of main component oxides ($Fe_2O_3$+MO+CoO) is determined, the proportion of $SiO_2$ is 0.02 to 5% by weight.

3. The hexagonal Z type magnetic oxide sintered material of claim 1 wherein part of cobalt is replaced by Me wherein Me is at least one of nickel, zinc, and copper.

4. The hexagonal Z type magnetic oxide sintered material of claim 1 which is produced by firing in air.

5. The hexagonal Z type magnetic oxide sintered material of claim 4 which is produced by calcining a source for the main oxide component, adding a source for the auxiliary oxide component to the calcined material, and firing the mixture.

6. A method for preparing the hexagonal Z type magnetic oxide sintered material of claim 1 comprising calcining a source for the main oxide component, adding a source for the auxiliary oxide component to the calcined material, and firing the mixture .

7. The method for preparing the hexagonal Z type magnetic oxide sintered material according to claim 6 wherein glass is used as the source for the auxiliary oxide component.

8. An impedance device comprising the hexagonal Z type magnetic oxide sintered material of claim 1.

9. The impedance device of claim 8 comprising a chip-shaped ferrite block having a first surface and a second surface opposed to the first surface, at least one through-hole extending through said ferrite block from the first surface to the second surface, an internal conductor formed within the hole, and a pair of terminal electrodes formed on surfaces of said ferrite block, the pair of terminal electrode being serially connected through the internal conductor, said ferrite block comprising the hexagonal Z type magnetic oxide sintered material.

10. The impedance device of claim 9 wherein at least two holes each having an internal conductor formed therein are present, the internal conductors being serially connected to each other.

* * * * *